(12) United States Patent
Ren et al.

(10) Patent No.: US 9,334,443 B1
(45) Date of Patent: May 10, 2016

(54) SYNTHESIS OF CSSNI₃ BY A SOLUTION BASED METHOD

(71) Applicant: Sun Harmonics, Ltd., Zhenjiang (CN)

(72) Inventors: Yuhang Ren, Secaucus, NJ (US); Jin Zhang, Zhejiang (CN); Chunhui Yu, Zhejiang (CN); Kai Shum, Orefield, PA (US)

(73) Assignee: Sun Harmonics, Ltd., Hangzhou (CN)

( * ) Notice: Subject to any disclaimer, the term of this patent is extended or adjusted under 35 U.S.C. 154(b) by 0 days.

(21) Appl. No.: 14/530,207

(22) Filed: Oct. 31, 2014

(51) Int. Cl.
| | |
|---|---|
| C01B 9/06 | (2006.01) |
| C01G 19/04 | (2006.01) |
| C09K 11/66 | (2006.01) |
| C01G 19/00 | (2006.01) |

(52) U.S. Cl.
CPC ............ C09K 11/665 (2013.01); C01G 19/006 (2013.01); C01P 2006/40 (2013.01); C01P 2006/60 (2013.01)

(58) Field of Classification Search
CPC .............. H01L 31/055; C01G 19/006; C09K 11/0833; C09K 11/616; C09C 2210/50
USPC ............... 423/463; 252/301.4 F, 520.1, 501.1
See application file for complete search history.

(56) References Cited

U.S. PATENT DOCUMENTS

| | | | |
|---|---|---|---|
| 3,615,188 A * | 10/1971 | Kouwenhoven et al. ..... | 423/710 |
| 4,301,033 A * | 11/1981 | Takumi et al. ............... | 502/8 |
| 8,529,797 B2 | 9/2013 | Shum | |
| 8,679,445 B1 | 3/2014 | Ren | |
| 2004/0245474 A1* | 12/2004 | Vieux et al. .............. | 250/370.11 |
| 2006/0198782 A1* | 9/2006 | Cai et al. ...................... | 423/653 |
| 2008/0038494 A1 | 2/2008 | Midgley | |
| 2010/0055350 A1 | 3/2010 | Pfenninger | |
| 2012/0306053 A1 | 12/2012 | Shum | |
| 2013/0233377 A1 | 9/2013 | Kanatzidis | |
| 2013/0284264 A1 | 10/2013 | Pfenninger | |

OTHER PUBLICATIONS

Chung et al.,; CsSnI3 Semiconductor or Metal? . . . ;Journal of American Chemistry Society; 2012;pp. 8579-8587.
Yamada et al.; 127I-NQR, 119 Sn Mossbauer Effect, and Electrical . . . ;Phys. Sci; 1990; pp. 307-312.
Chen et al., ;Synthesis and Characterization of CsSnI3 thin Films; Appl. Phys. Lett., 2010; pp. 221903(1-3).
Room Temperature "one-pot" Solution Synthesis of Nanoscale CsSnI₃ Orthorhombic Perovskite This Films and Particles; Zhou et al; 2013 Elsevier; Mar. 1, 2013; pp. 127-129.
Triply Resonant Raman Scattering in Perovskite Semiconductor CsSnI3; Yu et al; Journal of Raman Spectroscopy; Oct. 2, 2012; Abstract.
Crystal Preparation and Properties of Cesium tin (II) Trihalides; David E. Scaife et al; Journal of Solid State Chemistry, vol. 9, Issue 3, Mar. 1974; Abstract.

* cited by examiner

*Primary Examiner* — Ngoc-Yen Nguyen
(74) *Attorney, Agent, or Firm* — Myron Greenspan; Lackenbach Siegel, LLP

(57) ABSTRACT

This invention discloses a solution based synthesis of cesium tin tri-iodide (CsSnI₃). More specifically, the CsSnI₃ is fabricated in an organic Perovskite precursor solvent. CsSnI₃ are ideally suited for a wide range of applications such as light emitting and photovoltaic devices.

7 Claims, 2 Drawing Sheets

SYNTHESIS OF CSSNI₃ BY A SOLUTION BASED METHOD

BACKGROUND OF THE INVENTION

1. Field of the Invention

The invention generally relates to the formation of materials for photovoltaic devices and more specifically to the synthesis of $CsSnI_3$ by solution based method.

2. Description of the Prior Art

The current photovoltaic technologies can be classified by the different materials used for the light absorption in a solar cell. These materials include amorphous and polycrystalline silicon, CdTe, $CuIn_xGa_{1-x}Se_2$ (CIGS), GaAs, and photosensitive organic dyes. A transformative technology may emerge when a new and better material is discovered for photovoltaic applications.

$CsSnI_3$ is a unique phase-change material that exhibits four polymorphs. The black polymorph of $CsSnI_3$ could be obtained through a phase transition from the yellow polymorph $CsSnI_3$ by increasing its temperature above 425 K. It was further demonstrated by differential thermal analysis and X-ray diffraction that during the cooling of the black $CsSnI_3$ from 450 K, its ideal cubic Perovskite structure (B-α) deformed to a tetragonal structure (B-β) at 426 K, and became an orthorhombic structure (B-γ) below 351 K. [1] The $CsSnI_3$ is unique in combining two generally contra-indicated properties, strong photoluminescence (PL) and high electrical conductivity. [2, 3]

A need still exists in the industry for developing synthesis methods for $CsSnI_3$, especially in large scale. The successful implementation of these materials for various applications requires a detailed understanding of both their processing and materials properties.

At present, the synthesis of $CsSnI_3$ can be divided into solid-phase sintering and solution based methods. The solid-phase sintering method needs vacuum and high temperature which means high production costs. [1] For solution based method, K. Shum and Z. Chen offered a simple way to synthesize $CsSnI_3$, but the final product is not pure (U.S. Published Patent Application No. 2012/0306053). Here, we provide a simple solution based method to synthesize substantially pure $CsSnI_3$.

SUMMARY OF THE INVENTION

This invention is directed to synthesizing cesium tin tri-iodide ($CsSnI_3$) by a solution based method.

According to one aspect of the invention one embodiment in accordance with the invention is directed to a process of forming homogeneous $CsSnI_3$ in an organic Perovskite precursor solvent, comprising steps of:

(1) forming CsI solution from CsI powder;
(2) providing $SnI_2$;
(3) adding the $SnI_2$ into the CsI solution to form a mixture wherein the molar ratio of the $SnI_2$ and CsI in the mixture is approximately 1:1;
(4) heating the mixed solution at a temperature within the range of 50° C. to 250° C. until all the solvent is evaporated to form $CsSnI_3$ powder, and
(5) the process steps (1) to (4) are performed in a substantially inert environment.

The substantially inert environment may be created within a glove box and comprises a protective gas, such as $N_2$, including water vapor and oxygen the content of each of which is under 1 ppm and the temperature while heating the mixed solution ranges from about 50° C. to 250° C.

The homogeneous $CsSnI_3$ is formed by adding a $SnI_2$ solution into a CsI solution to form a mixture, and stirring the mixture for 1 to 3 hours to insure that the raw materials have fully reacted, and then the solution is aged for 12 to 24 hours to form the homogeneous $CsSnI_3$ precursor solution.

The CsI solution is about 25 mmol/L to 2 mol/L CsI solution by fully dissolving CsI powder (99.999% purity) in a solvent, and the $SnI_2$ solution is about 25 mmol/L to 2 mol/L $SnI_2$ solution by fully dissolving $SnI_2$ powder (99% purity) in a solvent.

The solvent for dissolving CsI powder (99.999% purity) is selected to serve as a Perovskite ligand to form coordination complexes, such as N,N-dimethylformamide (DMF), γ-butyrolactone (GBL) and mixtures thereof.

In the aforementioned process the $SnI_2$ is in the form of a $SnI_2$ solution.

The solvent for dissolving $SnI_2$ powder (99.999% purity) is selected to serve as a Perovskite ligand to form coordination complexes, such as N,N-dimethylformamide (DMF), γ-butyrolactone (GBL) and mixtures thereof.

The $SnI_2$ is in the form of a powder.

Other halides may be used to practice the invention. For example, a process of forming homogeneous $CsSnI_{(3-n)}X_n$ in an organic Perovskite precursor solvent, comprises the steps of:

(1) forming CsI solution from CsI powder;
(2) providing $SnI_2$ and $SnX_2$;
(3) adding the $SnI_2$ and $SnX_2$ into the CsI solution to form a mixture wherein the molar ratio of the raw materials is $SnX_2:SnI_2:CsI=y:(1-y):1$, where $0 \leq y \geq 1$;
(4) heating the final mixed solution at a temperature within the range of 50° C. to 250° C. until all the solvent is evaporated to form $CsSnI_{(3-n)}X_n$, wherein X is a halogen element selected from Group VIIA of the periodic table consisting of fluorine (F), chlorine (Cl), bromine (Br), iodine (I) and astatine (At) and $0 \leq n \leq 3$; and the process steps (1) to (4) are performed in a substantially inert environment.

In the aforementioned process the substantially inert environment may be created within a glove box and comprises a protective gas, such as $N_2$, including water vapor and oxygen content both under 1 ppm and the temperature while heating the final mixed solution ranges from about 50° C. to 250° C.

The homogeneous $CsSnI_{(3-n)}X_n$ is formed by adding a mixed solution of $SnI_2$ and $SnX_2$ into a CsI solution to form a mixture, and stirring the mixture for 1 to 3 hours to insure that the raw materials fully reacted, and then the solution is aged for 12 to 24 hours to form the homogeneous $CsSnI_{(3-n)}X_n$ precursor solution.

The CsI solution is about 25 mmol/L to 2 mol/L CsI solution by fully dissolving CsI powder (99.999% purity) in a solvent, and the mixed solution of $SnI_2$ and $SnX_2$ is about 25 mmol/L to 2 mol/L by fully dissolving $SnI_2$ and $SnX_2$ powder (99% purity) in a solvent.

The solvent for dissolving CsI powder (99.999% purity) is selected to serve as a Perovskite ligand to form coordination complexes, such as N,N-dimethylformamide (DMF), γ-butyrolactone (GBL) and mixtures thereof.

The $SnI_2$ and $SnX_2$ are in the form of a $SnI_2$ and $SnX_2$ solution.

The solvent for dissolving the $SnI_2$ and $SnX_2$ powder (99.999% purity) is selected to serve as a Perovskite ligand to form coordination complexes, such as N,N-dimethylformamide (DMF), γ-butyrolactone (GBL) and mixtures thereof.

The $SnI_2$ and $SnX_2$ are in the form of a powder.

In the process, the steps are preferably performed in a glove box under the protection of $N_2$ gas and the molar ratio of the $SnI_2$ and CsI in the mixture is essentially 1:1.

The CsI solution is made by fully dissolving CsI powder (99.999% purity) in a solvent selected from the Perovskite precursor solutions, such as N,N-dimethylformamide (DMF), γ-butyrolactone (GBL) and mixtures thereof. The concentration of CsI solution is about 25 mmol/L to 500 mmol/L.

The $SnI_2$ solution is made by fully dissolving $SnI_2$ powder (99% purity) in a solvent selected from the Perovskite precursor solutions, such as N,N-dimethylformamide (DMF), γ-butyrolactone (GBL) and mixtures thereof. The concentration of $SnI_2$ solution is about 25 mmol/L to 500 mmol/L.

BRIEF DESCRIPTION OF THE DRAWINGS

The accompanying drawings, which are incorporated in and form a part of the specification, illustrate preferred embodiments of the present invention, and together with the description, serve to explain the principles of the invention, in which.

DETAILED DESCRIPTION AND EXAMPLES

The $CsSnI_3$ exhibits outstanding optical, electrical, and ferroelectric properties. These features make $CsSnI_3$ ideally suited for a wide range of applications such as light emitting and photovoltaic devices.

More specifically, $CsSnI_3$ is a promising material in the application of solar cells since $CsSnI_3$ was found to possess a direct band gap of 1.32 eV at room temperature, right in the narrow region of optimal band gaps for the Shockley-Queisser maximum efficiency limit of a solar cell.

Figure 1:
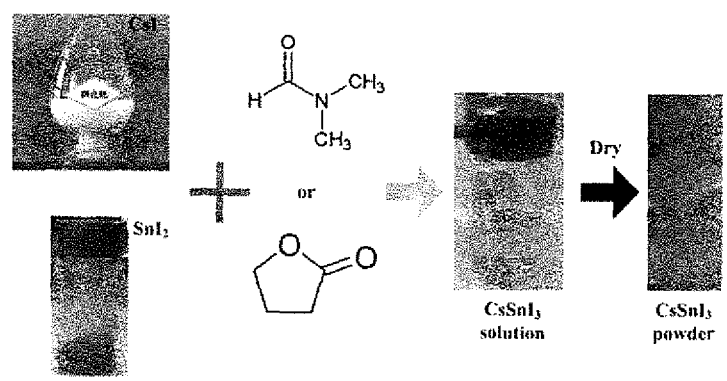
FIG. 1 shows the schematic diagram for the synthesis of $CsSnI_3$.

An effective method to synthesize large domain size high quality Perovskite semiconductor according to the present invention is disclosed. More specifically, a solution based method to synthesize $CsSnI_3$ is disclosed according to the present invention. The $CsSnI_3$ can be fabricated in an organic Perovskite precursor solvent as shown in FIG. 1. This synthesis method of the $CsSnI_3$ further enhances the likelihood of using $CsSnI_3$ as a new absorption material for solar cells.

Examples of procedures for synthesizing polycrystalline $CsSnI_3$ using reaction raw materials are described below. Generally, a process of forming homogeneous $CsSnI_3$ in an organic Perovskite precursor solvent, comprises the steps of:

(1) forming CsI solution from CsI powder;
(2) providing $SnI_2$;
(3) adding the $SnI_2$ into the CsI solution to form a mixture wherein the molar ratio of the $SnI_2$ and CsI in the mixture is substantially 1:1;
(4) heating the mixed solution at a temperature within the range of 50° C. to 250° C. until all the solvent is evaporated to form $CsSnI_3$ powder; and the process steps (1) to (4) are performed in a substantially inert environment.

The substantially inert environment may be created within a glove box and comprises a protective gas, such as $N_2$, including water vapor and oxygen content both under 1 ppm and the temperature while heating the mixed solution ranges from about 50° C. to 250° C.

The homogeneous $CsSnI_3$ is formed by adding a $SnI_2$ solution into a CsI solution to form a mixture, and stirring the mixture for 1 to 3 hours to insure that the raw materials have fully reacted, and then the solution is aged for 12 to 24 hours to form the homogeneous $CsSnI_3$ precursor solution.

The CsI solution is about 25 mmol/L to 2 mol/L CsI solution by fully dissolving CsI powder (99.999% purity) in a solvent, and the $SnI_2$ solution is about 25 mmol/L to 2 mol/L $SnI_2$ solution by fully dissolving $SnI_2$ powder (99% purity) in a solvent.

The solvent for dissolving CsI powder (99.999% purity) is selected to serve as a Perovskite ligand to form coordination complexes, such as N,N-dimethylformamide (DMF), γ-butyrolactone (GBL) and mixtures thereof.

The $SnI_2$ is in the form of a $SnI_2$ solution.

The solvent for dissolving $SnI_2$ powder (99% purity) is selected to serve as a Perovskite ligand to form coordination complexes, such as N,N-dimethylformamide (DMF), γ-butyrolactone (GBL) and mixtures thereof.

The $SnI_2$ is in the form of a powder.

Other halides may be used to practice the invention. More generally, a process of forming homogeneous $CsSnI_{(3-n)}X_n$ in an organic Perovskite precursor solvent, comprises steps of:

(1) forming CsI solution from CsI powder;
(2) providing $SnI_2$ and $SnX_2$;
(3) adding the $SnI_2$ and $SnX_2$ into the CsI solution to form a mixture wherein the molar ratio of the raw materials is $SnX_2:SnI_2:CsI=y:(1-y):1$, where $0 \leq y \leq 1$;
(4) heating the final mixed solution at a temperature within the range of 50° C. to 250° C. until all the solvent is evaporated to form $CsSnI_{(3-n)}X_n$, wherein X is a halogen element selected from Group VIIA of the periodic table consisting of fluorine (F), chlorine (Cl), bromine (Br), iodine (I) and astatine (At) and $0 \leq n \leq 3$; and the process steps (1) to (4) are performed in a substantially inert environment.

The substantially inert environment may be created within a glove box and comprises a protective gas, such as $N_2$, including water vapor and oxygen content both under 1 ppm and the temperature while heating the final mixed solution ranges from about 50° C. to 250° C.

The homogeneous $CsSnI_{(3-n)}X_n$ is formed by adding a mixed solution of $SnI_2$ and $SnX_2$ into a CsI solution to form a mixture, and stirring the mixture for 1 to 3 hours to insure that the raw materials fully reacted, and then the solution is aged for 12 to 24 hours to form the homogeneous $CsSnI_{(3-n)}X_n$ precursor solution.

The CsI solution is about 25 mmol/L to 2 mol/L CsI solution by fully dissolving CsI powder (99.999% purity) in a solvent, and the mixed solution of $SnI_2$ and $SnX_2$ is about 25 mmol/L to 2 mol/L by fully dissolving $SnI_2$ and $SnX_2$ powder (99% purity) in a solvent.

The solvent for dissolving CsI powder (99.999% purity) is selected to serve as Perovskite ligand to form coordination complexes, such as N,N-dimethylformamide (DMF), γ-butyrolactone (GBL) and mixtures thereof.

The $SnI_2$ and $SnX_2$ are in the form of a $SnI_2$ and $SnX_2$ solution.

The solvent for dissolving the $SnI_2$ and $SnX_2$ powder (99.999% purity) is selected to serve as a Perovskite ligand to form coordination complexes, such as N,N-dimethylformamide (DMF), γ-butyrolactone (GBL) and mixtures thereof.

The SnI$_2$ and SnX$_2$ are in the form of a powder.

The procedures of synthesizing polycrystalline CsSnI$_3$ using reaction raw materials have been described.

The reaction raw materials were milled and dissolved in a glove box under protect of N$_2$ gas.

The conditions in the glove box were: room temperature or temperature of 298.15 K (or 25° C., 77 F); water vapor and oxygen content are both under 1 ppm; and an absolute pressure of 100 kPa (or 14.504 psi, 0.986 atm).

WORKING EXAMPLES

Example 1

Preparation of CsI Solution

Initially, 0.13 gram of CsI (99.999% purity) powder was added to 10 mL GBL. The CsI powder was fully dissolved in GBL. The CsI solution was stirred for 30 minutes.

CsI solution was colorless and stable in glove box.

It would be apparent to one skilled in the art that CsI solutions could be made using any solvents in addition to those used in the examples. Examples of solvents that can be used include but are not limited to N,N-dimethylformamide (DMF), γ-butyrolactone (GBL) and mixtures thereof.

The concentration range of the CsI solution was from about 25 mmol/L to 500 mmol/L.

Example 2

Preparation of SnI$_2$ Solution

Initially, 0.186 gram of SnI$_2$ (99% purity) powder was added to 10 mL GBL. The SnI$_2$ powder was fully dissolved in GBL. The SnI$_2$ solution was stirred for 30 minutes.

SnI$_2$ solution was yellow and stable in glove box.

It would be apparent to one skilled in the art that SnI$_2$ solutions could be made using any solvents in addition to those used in the examples. Examples of solvents that can be used include but are not limited to, DMF, GBL or mixtures thereof.

The concentration range of the SnI$_2$ solution was from about 25 mmol/L to 500 mmol/L.

Example 3

Synthesis of CsSnI$_3$

A given amount of the prepared CsI solution was transferred to a reaction vial first. SnI$_2$ solution was then slowly added into the vial. The concentrations range of CsI and SnI$_2$ were both in a range of 25 mmol/L to 500 mmol/L, and their molar ratio was 1:1.

The mixed solution was stirred for 12 to 24 hours, and a uniform and transparent yellow CsSnI$_3$ solution was formed.

The homogeneous CsSnI$_3$ solution was dried until the solvent was all evaporated. The heating temperature ranged from about 100° C. to 200° C. Then the pure black CsSnI$_3$ powder with metallic luster was obtained as shown in FIG. 1. The chemical reaction for the mixed solution could be described as the following:

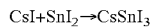

CsI+SnI$_2$→CsSnI$_3$

The reaction was verified by identifying the end products of CsSnI$_3$ using the X-ray diffraction (XRD) data.

Figure 2:
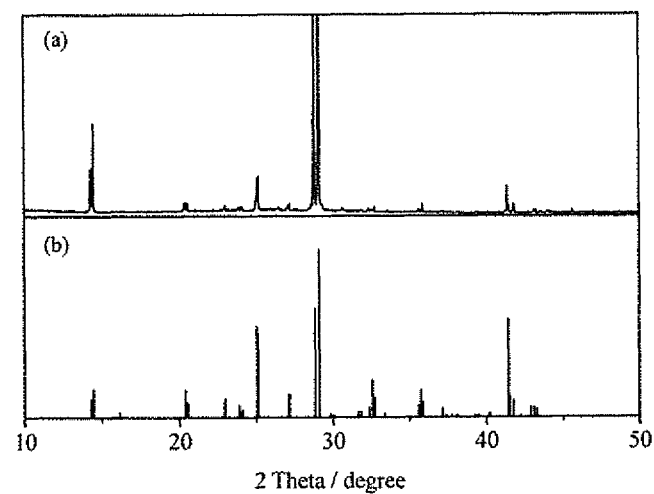
FIG. 2 shows the (a) X-ray diffraction data (XRD) profile taken from $CsSnI_3$ (concentrations of CsI and $SnI_2$ were both 50 mmol/L) and (b) standard XRD pdf card (43-1162) of black-γ phase of $CsSnI_3$.

FIG. 2 (a) shows the XRD data profile taken from CsSnI$_3$ (concentrations of CsI and SnI$_2$ were both 50 mmol/L).

FIG. 2 (b) showed the standard XRD pdf card (43-1162) of black-γ phase of CsSnI$_3$.

All the measured peaks were well matched to the black-γ phase of CsSnI$_3$.

In summary, CsSnI$_3$ was synthesized using the CsI and SnI$_2$ by solution based method.

A solution based method, was employed to fabricate CsSnI$_3$, especially suitable for solar cell applications. The polycrystalline quality was characterized by XRD data.

While the invention has been described in detail and with reference to specific examples thereof, it will be apparent to one skilled in the art that various changes and modifications can be made therein without departing from the spirit and scope thereof.

APPENDIX

1. I. Chung, J-H Song, J. Im, J. Androulakis, C. D. Malliakas, H. Li, A. J. Freeman, J. T. Kenney, and M. G. Kanatzidis, *J. Am. Chem. Soc.*, 2012, 134, 8579-8587.
2. K. Yamada, T. Matsui, T. Tsuritani, T. Z. Okuda, Naturforsch. A: Phys. Sci., 1990, 45, 307-312.
3. K. Shum, Z. Chen, J. Qureshi, C. Yu, J. J. Wang, W. Pfenninger, N. Vockic, J. Midgley, J. T. Kenney, Appl. Phys. Lett., 2010, 96, 221903.

What is claimed is:

1. A process of forming CsSnI$_3$ powder, comprising the steps of:
    (a) forming a CsI solution by dissolving CsI powder of purity equal to 99.999% in an organic solvent consisting of at least one of N,N-dimethylformamide (DMF), γ-butyrolactone (GBL) and mixtures thereof;
    (b) forming a SnI$_2$ solution by dissolving SnI$_2$ powder of purity equal to 99% in an organic solvent consisting of at least one of N,N-dimethylformamide (DMF), γ-butyrolactone (GBL) and mixtures thereof;
    (c) adding the SnI$_2$ solution into the CsI solution to form a composite solution wherein the molar ratio of the SnI$_2$ and CsI in said composite solution is approximately 1:1;
    (d) stirring said composite solution for at least one hour to obtain a homogeneous CsSnI$_3$ precursor solution;
    (e) aging said precursor solution at least for a predetermined time period after said stirring step;
    (f) heating said precursor solution following said aging step at a temperature within the range of 50° C. to 250° C. until all the solvent is evaporated to form CsSnI$_3$ powder exhibiting an XRD diffraction peak pattern for CsSnI$_3$ corresponding to the standard XRD-PDF card (43-1162) for the B-gamma-CsSnI$_3$ phase without exhibiting an XRD diffraction peak pattern for Cs$_2$SnI$_6$; and
    (g) the process steps (a) to (f) are performed in a substantially inert environment including a protective gas and water vapor and oxygen each at a level below 1 ppm.

2. The process of claim 1, wherein said substantially inert environment is created within a glove box.

3. The process of claim (1), wherein said precursor solution is aged for 12 to 24 hours to form a homogeneous CsSnI$_3$ precursor solution.

4. The process of claim 3, wherein the CsI solution is about 25 mmol/L to 2 mol/L CsI solution and the SnI$_2$ solution is about 25 mmol/L to 2 mol/L SnI$_2$ solution.

5. The process of claim 1, wherein said CsI powder is dissolved in said organic solvent to form CsI coordination complexes.

6. The process of claim 1, wherein said $SnI_2$ powder is dissolved in a said organic solvent to form $SnI_2$ coordination complexes.

7. The process of claim 2, wherein said protective gas is $N_2$.

* * * * *